(No Model.)
C. W. NASON.
APPARATUS FOR CENTERING AND INSERTING DISKS IN THE ENDS OF TUBES.
No. 331,529. Patented Dec. 1, 1885.
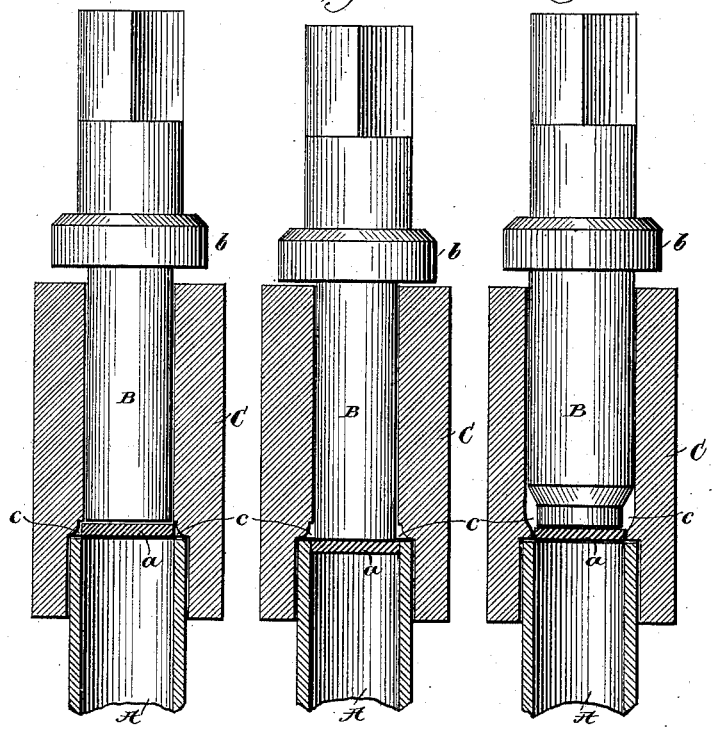
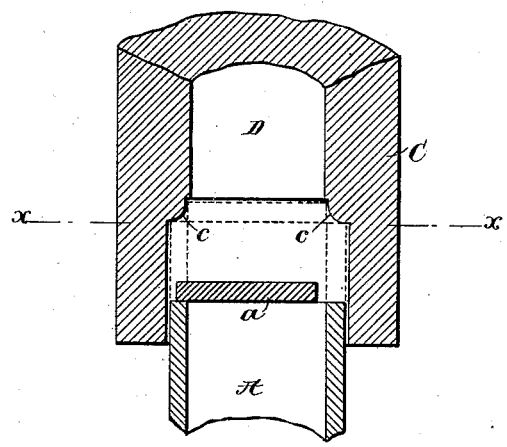
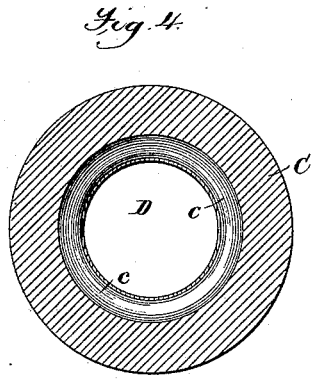

UNITED STATES PATENT OFFICE.

CARLETON W. NASON, OF NEW YORK, N. Y.

APPARATUS FOR CENTERING AND INSERTING DISKS IN THE ENDS OF TUBES.

SPECIFICATION forming part of Letters Patent No. 331,529, dated December 1, 1885.

Application filed October 9, 1885. Serial No. 179,375. (No model.)

*To all whom it may concern:*

Be it known that I, CARLETON W. NASON, a citizen of the United States, residing at New York, county of New York, and State of New York, have invented certain new and useful Improvements in Apparatus for Centering and Inserting Disks in the Ends of Tubes, fully described and represented in the following specification and the accompanying drawings, forming a part of the same.

In a companion application for Letters Patent I have described and illustrated a method of closing the ends of metal tubes, and particularly of such comparatively small tubes as are used for steam-radiators and for other similar purposes, which consists in inserting a snugly-fitting disk into the end of the tube which it is desired to close, and then subjecting the end of the tube (the end of the tube and the disk having been properly heated) to the action of rolls, by which the end of the tube is rolled onto and welded to the disk, so as to perfectly close the end of the former. In carrying this method into practical operation considerable difficulty was experienced in properly inserting the disk into the end of the tube which it was desired to close. If the disk were made of such size as to be readily inserted by hand, it fitted so loosely into the end of the tube that it was liable to turn or become displaced during the heating and welding operation, and thus prevent the tube from being perfectly closed. It was necessary, therefore, in order to produce good results, that the disk with which the end of the tube was closed should be cut of such size that it would fit so snugly into the end of the tube as to be prevented from turning or becoming displaced during the subsequent operations. When the disk was made to fit so snugly as this, it was necessary to employ considerable force to insert it into the end of the tube, and in order to employ this necessary force properly it was further necessary that the disk should be accurately presented to the open end of the tube.

The present invention relates to an apparatus which is especially designed for this purpose, and by the use of which the disks can be rapidly and accurately inserted in proper position for the welding operation.

The construction and operation of this apparatus will now be described, reference being had to the accompanying drawings, in which—

Figure 1 is a sectional elevation of the apparatus, showing the disk after it has been centered or brought into proper position to be inserted into the end of the tube. Fig. 2 is a similar view, showing the disk after it has been inserted. Fig. 3 is an enlarged sectional elevation of a part of the apparatus, illustrating the operation of centering the disk. Fig. 4 is a cross-section taken on the line $x\ x$ of Fig. 3, and Fig. 5 is a view similar to Fig. 1, showing a modification which will be hereinafter explained.

Referring particularly to Figs. 1 to 4, it is to be understood that the apparatus therein shown consists of two parts, a tubular shell or body, C, and a plunger or rammer, B. The central opening, D, of the shell C is for a portion of the length of the shell of a diameter equal to the exterior diameter of the tube into the end of which the disk is to be inserted, but is then contracted so as to form a curved or tapering shoulder, $c$, by which the diameter of the opening D is reduced, so as to be only equal to the interior diameter of the tube into which the disk is to be inserted. The opening D may be again enlarged above the shoulder $c$, or it may be of that diameter for the remainder of its length.

The plunger or rammer B, which is made of hard steel, and of a size to enter the opening D above the shoulder $c$, is provided with a collar, $b$, which abuts against the body C and prevents the end of the plunger from passing beyond the lower edge of the shoulder $c$.

The operation of the apparatus is as follows: The disk $a$, which is simply a piece punched out of a metal plate of the proper thickness, having been placed in any position upon the end of the tube A, as shown in Fig. 3, the shell C will be passed over the end of the tube until the shoulder $c$ comes into contact with the disk $a$. As soon as this takes place the shoulder will, by reason of its curvature or inclination, act upon the disk so as to bring it into exact register with the opening in the tube, as shown in Fig. 1, in which position it will be held by the shoulder. The rammer B will be then inserted in the opening D and operated by a blow or blows, or by pressure applied in any suitable manner, so as to force the disk into the end of the tube, as shown in Fig. 2. The rammer will be arrested by the collar $b$ as soon as the disk has been inserted the proper distance into the tube.

By means of this simple apparatus the disks can be inserted rapidly and accurately and can be made to fit so snugly that they will not turn during the welding operation.

If preferred, the curved or inclined shoulder $c$ for centering the disk may be formed as shown in Fig. 5. In this case the opening D is contracted abruptly, so as to form an abrupt shoulder, which rests upon the end of the tube and then expands so as to form the curved or inclined shoulder $c$. When the apparatus is thus constructed, the shell is placed on the end of the tube and the disk $a$ is then dropped into the upper end of the opening D and allowed to fall onto the shoulder $c$, which will act to bring it into register with the opening in the tube, as shown in Fig. 5. The disk will then be forced into the end of the tube by the rammer, the same as already described.

The shoulder $c$ will preferably be of convex form, as shown in Figs. 1 to 4, but it may be of concave form or a straight incline. The rammer B, instead of being loose, as shown, may be attached or connected to some suitable form of operating mechanism, as a hydraulic press. In such case the collar $b$ may be omitted.

What I claim is—

1. The herein-described device for centering disks over the ends of tubes, consisting of the tubular shell C, provided upon its interior with the curved or inclined shoulder $c$, substantially as described.

2. The combination, with the tubular shell C, provided upon its interior with the curved or inclined shoulder $c$, of the plunger or rammer B, substantially as described.

3. The combination, with the tubular shell C, provided upon its interior with the curved or inclined shoulder $c$, of the plunger or rammer B, having the collar $b$, substantially as described.

In testimony whereof I have hereunto set my hand in the presence of two subscribing witnesses.

CARLETON W. NASON.

Witnesses:
J. A. HOVEY,
JAS. J. KENNEDY.